US006589132B2

(12) United States Patent
Amisano et al.

(10) Patent No.: US 6,589,132 B2
(45) Date of Patent: Jul. 8, 2003

(54) DEVICE FOR CONTROLLING A CLUTCH FOR MOTOR VEHICLES

(75) Inventors: Fabrizio Amisano, Turin (IT); Giovanni Tornatore, S. Benigno Canavese (IT)

(73) Assignee: Magneti Marelli Powertrain, S.p.A. (IT)

( * ) Notice: Subject to any disclaimer, the term of this patent is extended or adjusted under 35 U.S.C. 154(b) by 0 days.

(21) Appl. No.: 09/909,875

(22) Filed: Jul. 23, 2001

(65) Prior Publication Data

US 2002/0016232 A1 Feb. 7, 2002

(30) Foreign Application Priority Data

Jul. 25, 2000 (IT) ........................................ TO00A0736

(51) Int. Cl.[7] .............................................. B60K 41/02
(52) U.S. Cl. .......................................... 477/77; 701/67
(58) Field of Search ............................. 477/39, 54, 57, 477/70, 74, 77, 78, 79, 80, 83, 84, 174, 176, 175, 180, 86, 906; 701/34, 63, 67, 68; 192/85 R, 91 R

(56) References Cited

U.S. PATENT DOCUMENTS

| | | | | |
|---|---|---|---|---|
| 4,646,891 A | * | 3/1987 | Braun ..................... | 192/111 A |
| 4,667,541 A | * | 5/1987 | Shimaoka et al. ............ | 477/61 |
| 4,671,397 A | | 6/1987 | Asagi et al. | |
| 4,947,325 A | * | 8/1990 | Iwata et al. ................. | 180/233 |
| 5,032,995 A | * | 7/1991 | Matsuda et al. ............ | 180/233 |
| 5,176,234 A | * | 1/1993 | Reik et al. ................. | 192/53.2 |
| 5,439,426 A | * | 8/1995 | Nakashima ................. | 477/125 |
| 5,481,906 A | * | 1/1996 | Nagayoshi et al. ........... | 701/33 |
| 5,507,373 A | * | 4/1996 | Nguyen ..................... | 192/3.58 |
| 5,666,863 A | * | 9/1997 | Sunada et al. ........... | 192/109 F |
| 5,839,561 A | * | 11/1998 | Koda et al. ................. | 192/84.6 |
| 5,853,350 A | * | 12/1998 | Hasegawa et al. .......... | 477/166 |
| RE37,572 E | * | 3/2002 | Kremmling et al. ........ | 192/222 |

FOREIGN PATENT DOCUMENTS

DE 19810923 9/1999

OTHER PUBLICATIONS

Patent Abstract of Japan, Pub. No. 2000130474, Pub. Date May 12, 2000.

* cited by examiner

Primary Examiner—Rodney H Bonck
Assistant Examiner—David D. Le
(74) Attorney, Agent, or Firm—Hall, Priddy, Myers & Vande Sande

(57) ABSTRACT

Device for controlling a clutch, which is connected to an actuator, which can activate the clutch itself; the control device comprises a position sensor, which can detect the position of the clutch, in order to supply a measuring position signal to a main control device, which receives as input information signals, and generates as output a control signal to control the actuator, a monitoring circuit, which can detect a state of malfunctioning of the position sensor, in order to supply a malfunctioning signal, and an auxiliary control device, which can be activated in the presence of a malfunctioning signal, in order to transfer control of the actuator from the main control device to the auxiliary control device.

9 Claims, 7 Drawing Sheets

DEVICE FOR CONTROLLING A CLUTCH FOR MOTOR VEHICLES

The present invention relates to a device for controlling a clutch for motor vehicles.

BACKGROUND OF THE INVENTION

As is known, during the activation for opening and closure of the clutch, for example during the manoeuvres of change of gear and pick-up of the vehicle, the torque values transmitted by the engine to the drive wheels via the clutch itself depend mainly on the load which is applied to the clutch disc, the value of which depends on the position of the control lever of the clutch itself.

The operations of activation of the clutch are normally carried out manually by the driver of the vehicle, who regulates the position of the control lever, in order to obtain substantially gradual transfer of the torque via the clutch itself, and thus comfortable travel of the vehicle.

It is also known to carry out the operations of activation of the clutch fully automatically, by means of electronic control devices, the purpose of which, during activation of the clutch, is to regulate the position of the control lever of the clutch itself, according to a plurality of input signals.

The control devices of a known type are normally provided with an electronic system, which receives information signals at its input, and controls opening/closure of the clutch, by means of a solenoid valve, which receives pressurised fluid from a hydraulic circuit, and, on the basis of signals received, can activate an actuator which is connected to the clutch.

The control devices additionally comprise a position sensor, which is connected to the actuator, and generate as output a reaction signal which is correlated to the operative position of the actuator, and a control circuit which is disposed in the electronic system, and receives the reaction signal, on the basis of which a control signal is supplied to the solenoid valve.

In particular, the control circuit comprises a estimator circuit, which receives as input a plurality of information signals (i.e. values such as the position of the pedal of the accelerator, the angular speed of the engine, the angular speed of the clutch, the position of the brake pedal etc.), and supplies as output a signal for the estimated position of the clutch.

The control circuit additionally comprises an adder circuit, which receives as input the reaction signal of the position sensor and the signal for the estimated position, and supplies an error signal to an input of a controller circuit (for example of the proportional-integral-derivative PID type), which in turn supplies as output the control signal of the solenoid valve.

The control devices of the known type have the disadvantage that if a fault of the position sensor occurs, the control circuit receives a reaction signal which has an incorrect value, and consequently it is no longer able to supply a correct control signal to the solenoid valve.

In these conditions, activation of the actuator becomes inaccurate, problematic and/or impossible, with obvious safety risks, caused by the lack of opening/closure of the clutch.

SUMMARY OF THE INVENTION

The object of the present invention is to provide a control device for a clutch for motor vehicles, which can control the actuator unit of the clutch, even if the aforementioned position sensor is faulty.

BRIEF DESCRIPTION OF THE DRAWINGS

In order to assist understanding of the invention, an embodiment is now described, purely by way of non-limiting example, and with reference to the attached drawings, in which.

DETAILED DESCRIPTION OF THE INVENTION

Figure 1:
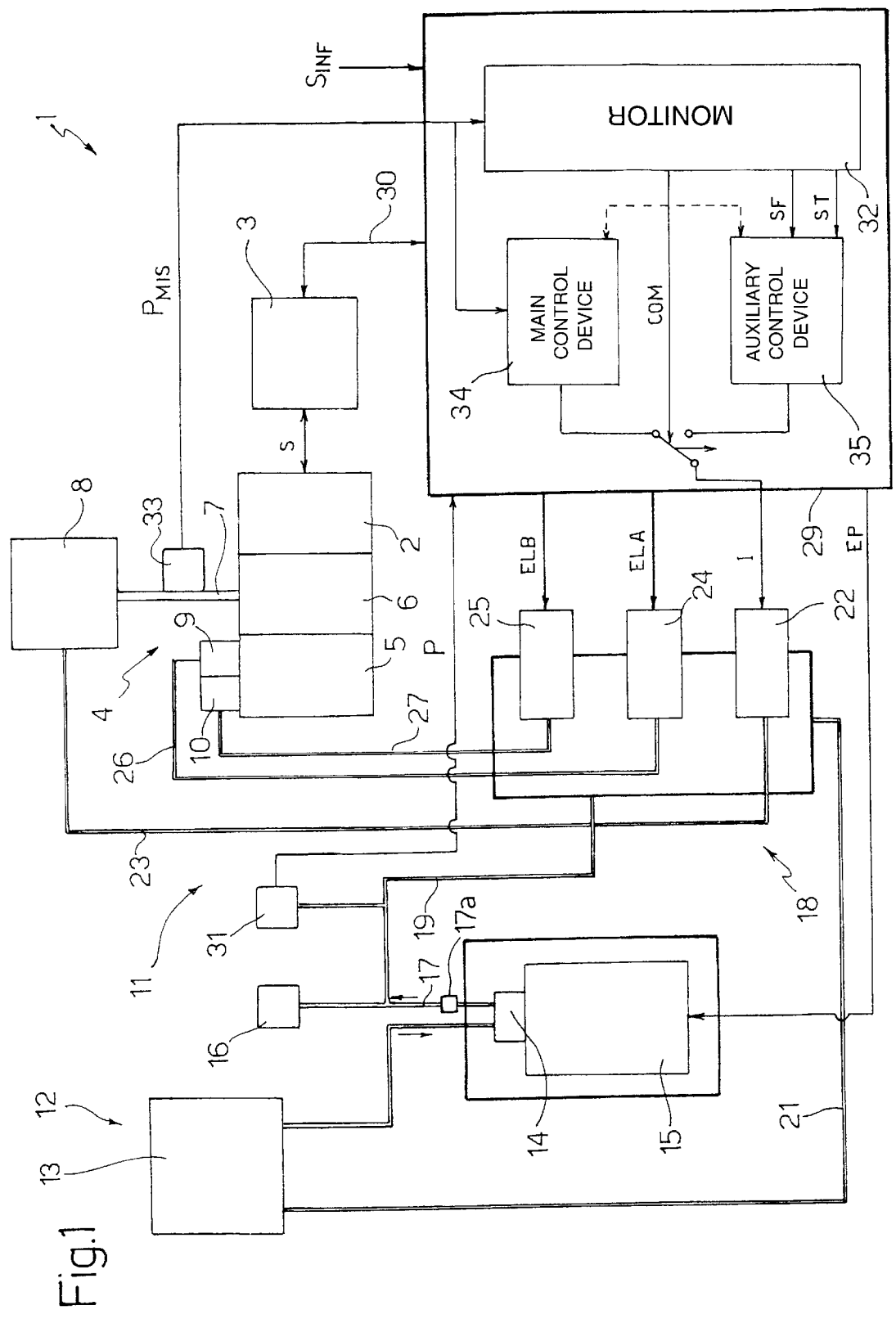
FIG. 1 illustrates a block diagram of a first embodiment of a control device produced according to the dictates of the present invention.

With reference to FIG. 1, 1 indicates as a whole a first embodiment of a control device, which cooperates with an endothermic engine 2, for example a petrol or diesel engine (illustrated schematically).

The engine 2 co-operates with an electronic engine control circuit 3, which receives as input a plurality of parameters S, which are measured mainly in the engine 2, and supplies control signals to an ignition system (not illustrated) and to an injection system (not illustrated).

The engine 2 supplies mechanical power via a shaft (not illustrated) to an automated transmission unit 4, comprising a gearbox 5 and a clutch 6, which is interposed between an output shaft (not illustrated) of the engine 2 and the input shaft of the gearbox 5 itself, which supplies mechanical power to the wheels of the vehicle (not illustrated).

In particular, the clutch 6 is connected by means of a control lever 7 to a first actuator 8, in order to activate the opening and closure of the clutch 6 itself, and the gearbox 5 is associated with a second and a third actuator 9, 10, in order to control respectively selection and engagement/release of the gears of the gearbox 5 itself.

In detail, the control lever 7 makes it possible to vary in a known manner the load which is applied to a disc (not illustrated) of the clutch, and thus the torque which is transmitted via the clutch 6 itself.

The first, second and third actuators 8, 9 and 10 receive pressurised operative fluid from a hydraulic circuit 11.

In particular, the hydraulic circuit 11 comprises:

- a source 12 of operative fluid, which is defined by a tank 13 which contains oil;
- a pump 14, which is activated by an electric motor 15, and receives as input the operative fluid obtained from the tank 13;
- a hydraulic accumulator 16, which receives as input, via a supply pipe 17 which is connected to a one-way valve 17a, the operative fluid obtained from the pump 14;

a valve unit 18, which receives as input, via a pipe 19, the pressurised operative fluid supplied as output by the hydraulic accumulator 16; and a re-circulation pipe 21, which extends between a re-circulation output of the valve unit 18, and an intake of the tank 13.

The valve unit 18 comprises a first solenoid valve 22, which in this case is a 3-way, 2-position solenoid valve, which is connected via a pipe 23 to the first actuator 8, in order to supply the fluid necessary for activation of the first actuator 8 itself, by carrying out the opening/closure of the clutch 6, and a second and a third solenoid valve 24, 25, which are connected via respective pipes 26, 27 respectively to the second and third actuators 9, 10, in order to supply the fluid necessary for actuation of the gearbox 5.

The valve unit 18 receives as input a plurality of control signals from an electronic control system 29, which can control the activation of the first, second and third actuators 8, 9, 10; in particular, the current for the first solenoid valve 22 is piloted by the electronic control system 29, by means of a control signal I, whereas the second and third solenoid valves 24 and 25 are controlled by the electronic control system 29, via respective control signals ELA, ELB.

The electronic control system 29 co-operates with the engine electronic control circuit 3, with which it is connected via a two-way data transmission line 30, and it is also connected to a pressure sensor 31, which is disposed on the pipe 19, and can supply to the electronic control system 29 a signal P, which is proportional to the pressure of the fluid present in the hydraulic circuit 11.

By means of a signal EP, the electronic control system 29 controls cycles of switching on/switching off of the electric motor 15, which activates/de-activates the pump 14, in order to guarantee a minimum pressure value inside the hydraulic accumulator 16.

The electronic control system 29 comprises a monitoring circuit 32 of a known type, which, inter alia, can analyse the functioning of a position sensor 33, which is connected to the control lever 7, and generates a measuring position signal $P_{MIS}$, which is correlated to the operative position of the first actuator 8 itself, and thus to the position of the control lever 7 present in the clutch 6.

Alternatively, the sensor 33 could be connected to a thrust bearing (not illustrated) of the clutch 6; in this case, the sensor 33 would supply the position of the thrust bearing.

The monitoring circuit 32 is connected to the position sensor 33, in order to receive as input the measuring position signal $P_{MIS}$, and to supply as output a signal COM, which has a first logic value when the position sensor 33 is analysed as faulty by the monitoring circuit 32 itself, and a second logic value if the functioning of the position sensor 33 is analysed as correct.

The electronic control system 29 additionally comprises a main control device 34 and an auxiliary control device 35, which are activated alternatively by the monitoring circuit 32, on the basis of the logic value of the signal COM, and can receive as input a plurality of information signals $S_{INF}$, in order to generate as output the control signal I for piloting of the first solenoid valve 22, and thus for control of the actuator 8 and regulation of the position of the control lever 7.

In detail, when the signal COM has the second logic value (sensor 33 functioning), the main control device 34 is activated, and the auxiliary control device 35 is de-activated; if, on the other hand, the signal COM has the first logic value (sensor 33 faulty), the auxiliary control device 35 is activated, and the main control device 34 is de-activated.

The information signals $S_{INF}$, on the basis of which the control signal I is generated, are signals which are correlated to operative values and values of the state of the vehicle, i.e. values such as the position of the accelerator pedal, the angular speed of the engine 2, and the angular speed of the clutch 6.

Figure 2:
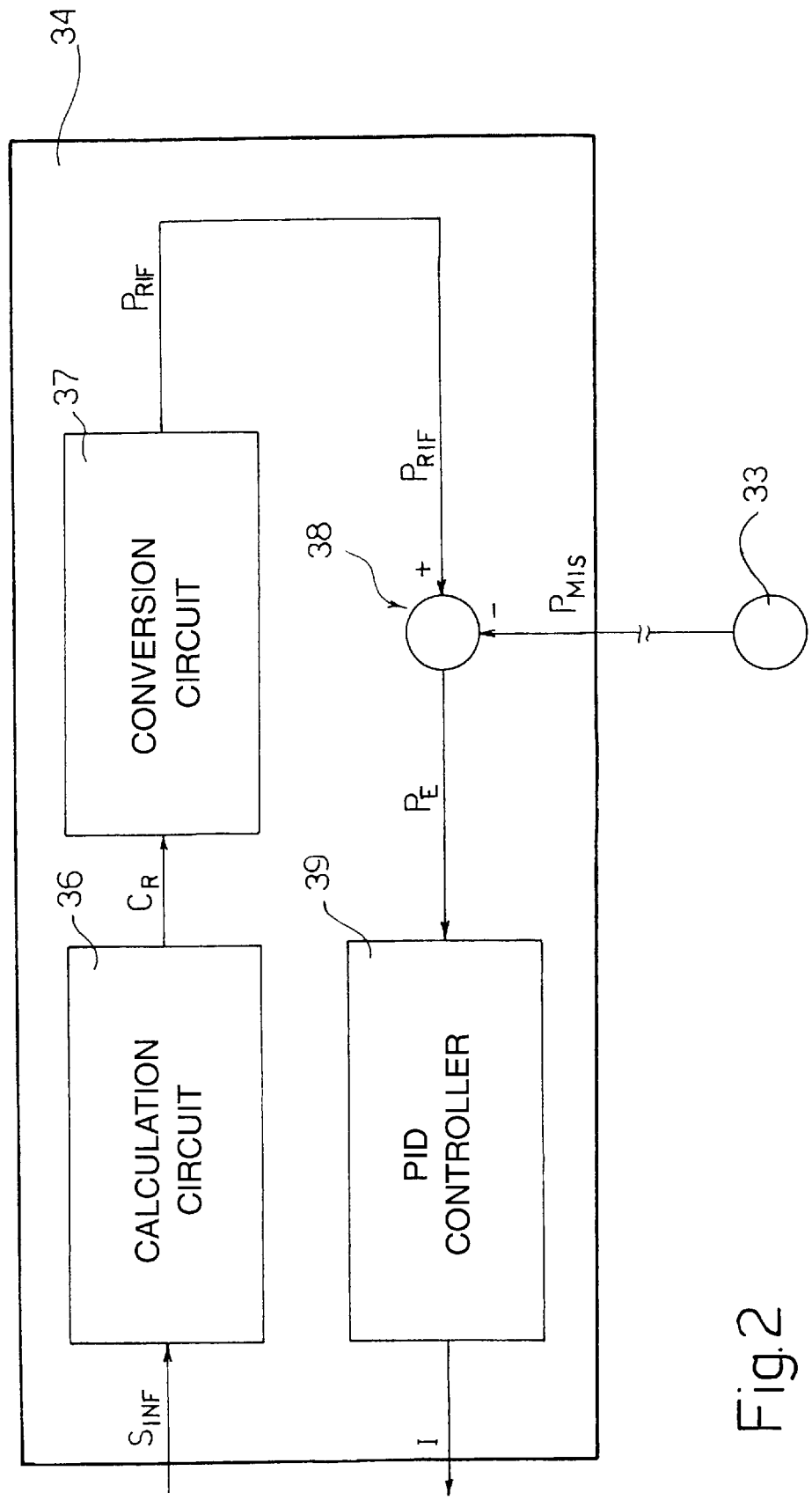
FIG. 2 represents a block diagram of a component of the control device in FIG. 1.

With reference to FIG. 2, the main control device 34 comprises a calculation circuit 36 of a known type, which receives as input the information signals $S_{INF}$, and supplies as output a required torque signal $C_R$, calculated on the basis of the information signals $S_{INF}$.

The main control device 34 additionally comprises a conversion circuit 37 of a known type, which receives as input the torque signal $C_R$ required by the calculation circuit 36, and generates as output, on the basis of the said required torque signal $C_R$, a reference position signal $P_{RIF}$ for the first actuator 8.

The reference position $P_{RIF}$ is calculated by means of a function of transmissibility FT ($C_R$) of the clutch 6, stored in a memory (not illustrated) of the electronic control system 29. In particular, in the memory (not illustrated), there is stored a table which contains a plurality of numerical values, which define the function of transmissibility FT ($C_R$) of the clutch 6, which, for each required torque value $C_R$ to be transmitted via the clutch 6, makes it possible to determine the reference positions $P_{RIF}$ assumed by the control lever 7 of the clutch 6 itself.

In detail, the function of transmissibility FT ($C_R$) defines a biunique association between the torque $C_R$ required, and the reference position $P_{RIF}$ of the first actuator 8 of the clutch 6.

The main control device 34 comprises an adder circuit 38, which receives as input the measuring position signal $P_{MIS}$, which is indicative of the value measured by the position sensor 33, of the position of the first actuator 8, and thus of the control lever 7 of the clutch 6, and the reference position signal $P_{RIF}$, and generates as output a position error signal $P_E$, which is provided by the difference between the reference position signal $P_{RIF}$ and the measuring position signal $P_{MIS}$.

The main control device 34 also comprises a control circuit 39 of a known type, for example of the proportional-integral-derivative PID type, which receives as input the position error signal $P_E$, and generates as output the control signal I used for control of the first solenoid valve 22, and thus for control of the first actuator 8, and for regulation of the position of the control lever 7. It is however apparent that power amplifier circuits (not illustrated) convert the control signal I from the control circuit 39, such as to generate a current with a value sufficient for piloting of the first solenoid valve 22.

Figure 3:
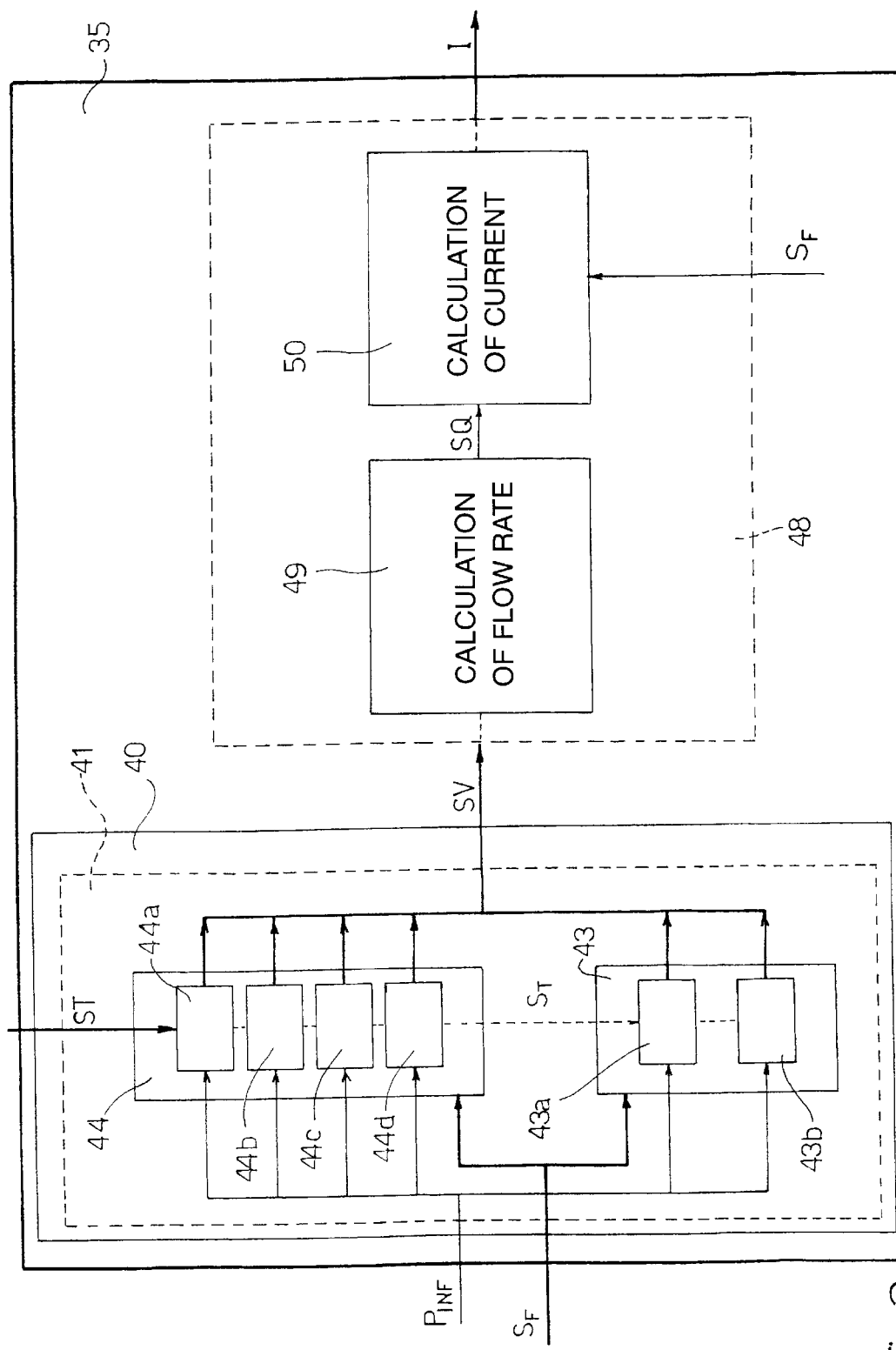
FIG. 3 represents a block diagram of a component of the control device in FIG. 1.

With reference to FIG. 3, the auxiliary control device 35 (which is activated by the monitoring circuit 32, in the event of malfunctioning of the position sensor 33), comprises a reading circuit 40, which receives as input, from the monitoring circuit 32, a signal for the state of the clutch $S_F$, a signal for the operative condition $S_T$, and the information signals $S_{INF}$, and generates as output a speed signal $S_V$, which is calculated on the basis of the input signals, and indicates the speed of opening/closure of the clutch 6.

In detail, the signal for the state of the clutch $S_F$ encodes information concerning the state of the clutch 6, and, in particular, if the clutch 6 is going into a position of opening, the signal for the state of the clutch $S_F$ has a first logic level, and if the clutch 6 is going into a position of closure, the signal for the state of the clutch $S_F$ has a second logic level.

The signal for the operative condition $S_T$ is supplied by the monitoring circuit 32, and encodes in a known manner six respective operative conditions of the automated transmission unit 4, which are as follows:

Operative condition of opening of the clutch 6 during pick-up of the vehicle (when acceleration occurs);

Operative condition of opening of the clutch 6 during a change of gears;

Operative condition of maintenance of opening of the clutch 6 during pick-up;

Operation condition of maintenance of opening of the clutch 6 during a change of gears;

Operative condition of closure of the clutch 6 during pick-up (when braking occurs);

Operative condition of closure of the clutch 6 during the change of gears.

The reading circuit 40 comprises a memory 41, inside which there are stored a first and a second table 43, 44, each of which contains the numerical values of the speed of the clutch 6, relative to the condition in which the clutch is respectively closing and opening.

The first and the second table 43, 44 are selected by the reading circuit 40, by means of the signal for the state of the clutch $S_F$; in detail, if the signal for the state of the clutch $S_F$ has the second logic level (the clutch 6 is going into the position of closure), the first table 43 is selected, whereas if the signal for the state of the clutch $S_F$ has the first logic level (the clutch is going into the position of opening), the second table 44 is selected.

The first table 43 comprises in turn a first and a second sub-table 43a and 43b, which are selected by means of the signal for the operative condition $S_T$, and each contain numerical values which indicate the speed of the clutch 6, respectively in the operative conditions of closure of the clutch 6 itself during pick-up, and closure of the clutch 6 during a change of gear.

In particular, the first sub-table 43a contains a plurality of numerical values, which define a first reading function F1 ($S_{INF}$) of the clutch 6, which makes it possible to determine the speed signal $S_V$, on the basis of the information signals $S_{INF}$, in the condition in which the clutch 6 is closed during pick-up of the vehicle; the second sub-table 43b contains a plurality of numerical values, which define a second reading function F2 ($S_{INF}$) of the clutch 6, which makes it possible to determine the speed signal $S_V$, on the basis of the information signals $S_{INF}$, in the condition in which the clutch 6 is closed during a change of gear.

The second table 44 contains a first, second, third and fourth table 44a, 44b, 44c, 44d, which can be selected by means of the signal for the operative condition $S_T$, and each contain numerical values which indicate the speed of the clutch 6, in the respective operative conditions of opening of the clutch 6 during pick-up of the vehicle (when acceleration takes place), opening of the clutch 6 during a change of gear, keeping the clutch 6 open during a change of gear, and keeping the clutch 6 open during pick-up.

In particular, the first sub-table 44a contains a plurality of numerical values which define a third reading function F3 ($S_{INF}$) of the clutch 6, which makes it possible to determine the speed signal $S_V$, according to the information signals $S_{INF}$, in the condition in which the clutch is opened during pick-up of the vehicle; the second sub-table 44b contains a plurality of numerical values which define a fourth reading function F4 ($S_{INF}$) of the clutch 6, which makes it possible to determine the speed signal $S_V$, according to the information signals $S_{INF}$, in the condition in which the clutch is opened during the change of gear; the third sub-table 44c contains a plurality of numerical values which define a fifth reading function F5 ($S_{INF}$) of the clutch 6, which makes it possible to determine the speed signal $S_V$, according to the information signals $S_{INF}$, in the condition in which the clutch 6 is kept open during pick-up of the vehicle; and the fourth sub-table 44d contains a plurality of numerical values which define a sixth reading function F6 ($S_{INF}$) of the clutch 6, which makes it possible to determine the speed signal $S_V$, according to the information signals $S_{INF}$, in the condition in which the clutch is kept open during the change of gear of the vehicle.

If the signal for the state of the clutch $S_F$ relates to a condition in which the clutch 6 is closed, the first table 43 is selected, from which the sub-table 43a is selected, if the signal for the operative condition $S_T$ relates to the pick-up condition, whereas the sub-table 43b is selected, if the signal for the operative condition $S_T$ relates to the change of gear condition.

If the signal for the operative condition $S_T$ relates to a condition in which the clutch is opened, the second table 44 is selected, from which there is selected respectively the first sub-table 44a, if the signal for the operative condition $S_T$ relates to the pick-up condition, the sub-table 44b, if the signal for the operative condition $S_T$ relates to the change of gear condition, the sub-table 44c, if the signal for the operative condition $S_T$ relates to the condition of keeping the clutch 6 open during pick-up, and the sub-table 44d, if the signal for the operative condition $S_T$ relates to the condition of keeping the clutch 6 open during the change of gear.

According to a variant, not illustrated, the sub-tables 43a, 43b, 44a, 44b, 44c, 44d each generate a respective speed signal $S_V$ (which has a fixed value which is not dependent on the information signals $S_{INF}$), and are selected by means of the signal for the state of the clutch $S_F$, and the signal for the operative condition $S_T$. In this case, the reading circuit 40 does not have at its input the information signals $S_{INF}$ (which are not necessary in order to calculate the speed signal $S_V$), since the speed signal $S_V$ is biunique for each of the above-described operative conditions of the clutch 6.

The auxiliary control device 35 additionally comprises an open-loop calculation circuit 48, which receives the speed signal $S_V$ as input from the reading circuit 40, and supplies the control signal I as output to the first solenoid valve 22.

The open-loop calculation circuit 48 comprises a flow rate calculation circuit 49 of a known type, which receives as input the speed signal $S_V$, and supplies as output a flow-rate signal $S_Q$, which indicates the required flow rate $Q_R$ of fluid which the first solenoid valve 22 must supply to the first actuator 8, in order to obtain displacement of the clutch 6 according to the required speed indicated by the speed signal $S_V$.

In detail, the flow-rate calculation circuit 49 calculates the required flow rate $Q_R$ in a known manner, by means of an equation of a known type, which takes into account the dimensions of the first actuator 8, and in particular the cross-section of the first actuator 8 itself.

The open-loop calculation circuit 48 finally comprises a current calculation circuit 50, which receives as input the flow-rate signal $S_Q$ and the signal for the state of the clutch $S_F$, and supplies as output the control signal I, on the basis of the input signals.

Figure 7:
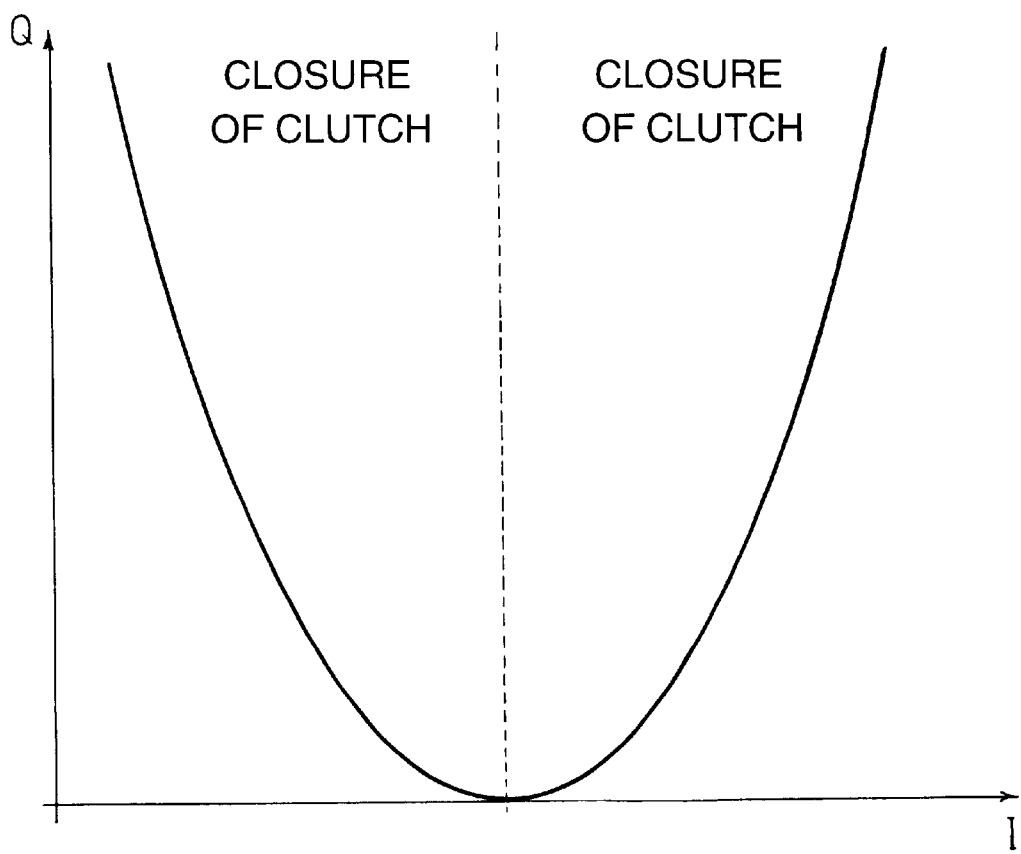
FIG. 7 illustrates a characteristic function, which indicates the development of the flow rate of fluid, according to the current I in a solenoid valve.

The current calculation circuit 50 implements a table containing a plurality of numerical values, which define a characteristic function Q(I) illustrated in FIG. 7, which makes it possible to estimate the value of the current I to be supplied to the first solenoid valve 22, according to the required flow rate of fluid $Q_R$, in order to activate the first actuator 8. The table implemented by the current calculation circuit 50 takes into account information concerning the state (open/closed) of the clutch 6, supplied by the signal for the state of the clutch SF.

In use, if the position sensor 33 functions correctly, the signal COM supplied by the monitoring circuit 32 has the second logic value, and thus the main control device 34 is active (the auxiliary control device 35 is de-activated), and pilots the first solenoid valve 22 by means of the control signal I, which is determined in a known manner by the control circuit 39, according to the difference between the measuring position $P_{MIS}$ supplied by the position sensor 33, and the reference position $P_{RIF}$ determined according to the information signals $S_{INF}$.

If the position sensor 33 malfunctions, the monitoring circuit 32 detects this, and by means of the signal COM commands respectively de-activation of the main control device 34, and activation of the auxiliary control device 35.

In these conditions, by means of the signal for the operative condition $S_T$ and the signal for the state $S_F$, the reading circuit 40 selects one of the six tables 43a, 43b, 44a, 44b, 44c, 44d present in the memory 41, and supplies as output the speed signal $S_V$, which is determined according to the information signals $S_{INF}$ which are present at the input of the reading circuit 40 itself.

At this point, the open-loop calculation circuit 48 receives as input the speed signal $S_V$, and converts it (by means of the flow-rate calculation circuit 49 and the current calculation circuit 50) into the control signal I, for piloting of the first solenoid valve 21, and thus of the first actuator 8 for activation of the clutch 6.

This therefore assures control of the lever 7, even in conditions of malfunctioning of the sensor 33.

The clutch 6 is also controlled on the basis of the momentary operating conditions (signal for the state of the clutch $S_F$ and signal for the operative condition $S_T$) of the clutch 6 itself, thus, for each of the above-described operative conditions, guaranteeing activation of the clutch 6 which is suitable for the condition in use.

Figure 4:
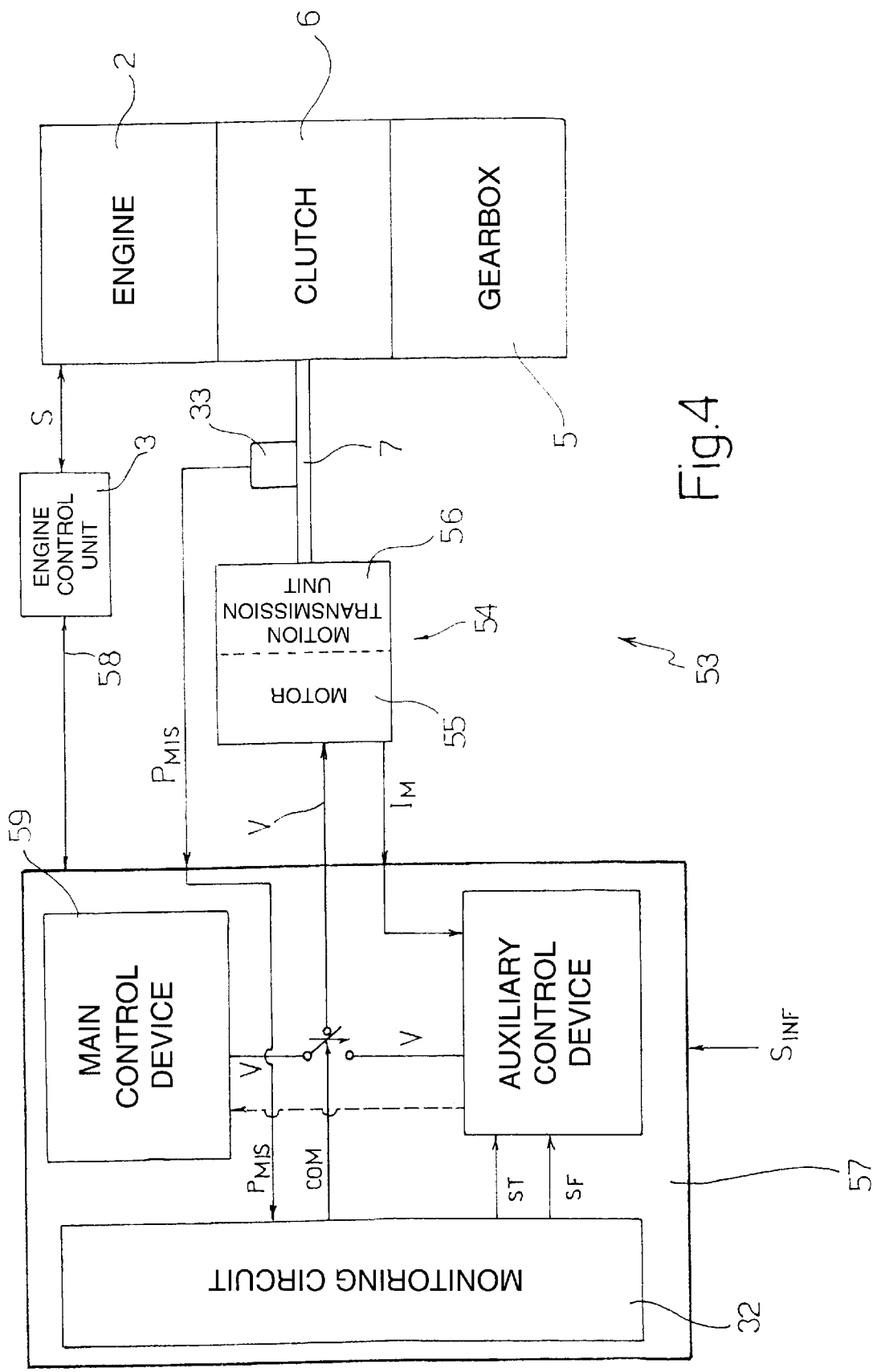
FIG. 4 illustrates a block diagram of a second embodiment of a control device produced according to the dictates of the present invention.

With reference to FIG. 4, 53 indicates as a whole a second embodiment of a control device, which is similar to the control device 1 previously described, and the component parts of which will be marked by the same reference numbers which mark corresponding components of the control device 1.

The control device 53 can control the control lever 7 (which is of a known type, and is illustrated schematically) of the clutch 6, by means of an electric actuator 54, which comprises an electric motor 55 which is connected to the control lever 7 itself by means of a transmission unit 56 of a known type, which can convert the rotary motion of the electric motor 55 into linear motion of displacement of the control lever 7, and thus of the clutch 6.

The control device 53 comprises an electronic control system 57, which receives as input the information signals $S_{INF}$, and a current signal $I_M$ which is indicative of the current which is circulating in the windings (not illustrated) of the electric motor 55, and, on the basis of the input signals, generates as output a control signal V, the value of which is proportional to the piloting voltage V of the electric motor 55.

The electronic control system 57 is connected by means of a two-way data line 58 to the engine electronic control circuit 3, and receives as input the measuring position signal $P_{MIS}$ supplied by the position sensor 33, which is connected to the control lever 7, and the measuring position signal $P_{MIS}$ of which is correlated to the operative position of the control lever 7 present in the clutch 6.

Similarly to the situation illustrated for the electronic control system 29, the electronic control system 57 comprises the monitoring circuit 32, which, inter alia, can analyse the functioning of the position sensor 33, in order, by means of the signal COM, to activate a main control circuit 59, which receives as input the information signals $S_{INF}$, and generates as output the control signal V.

Figure 5:
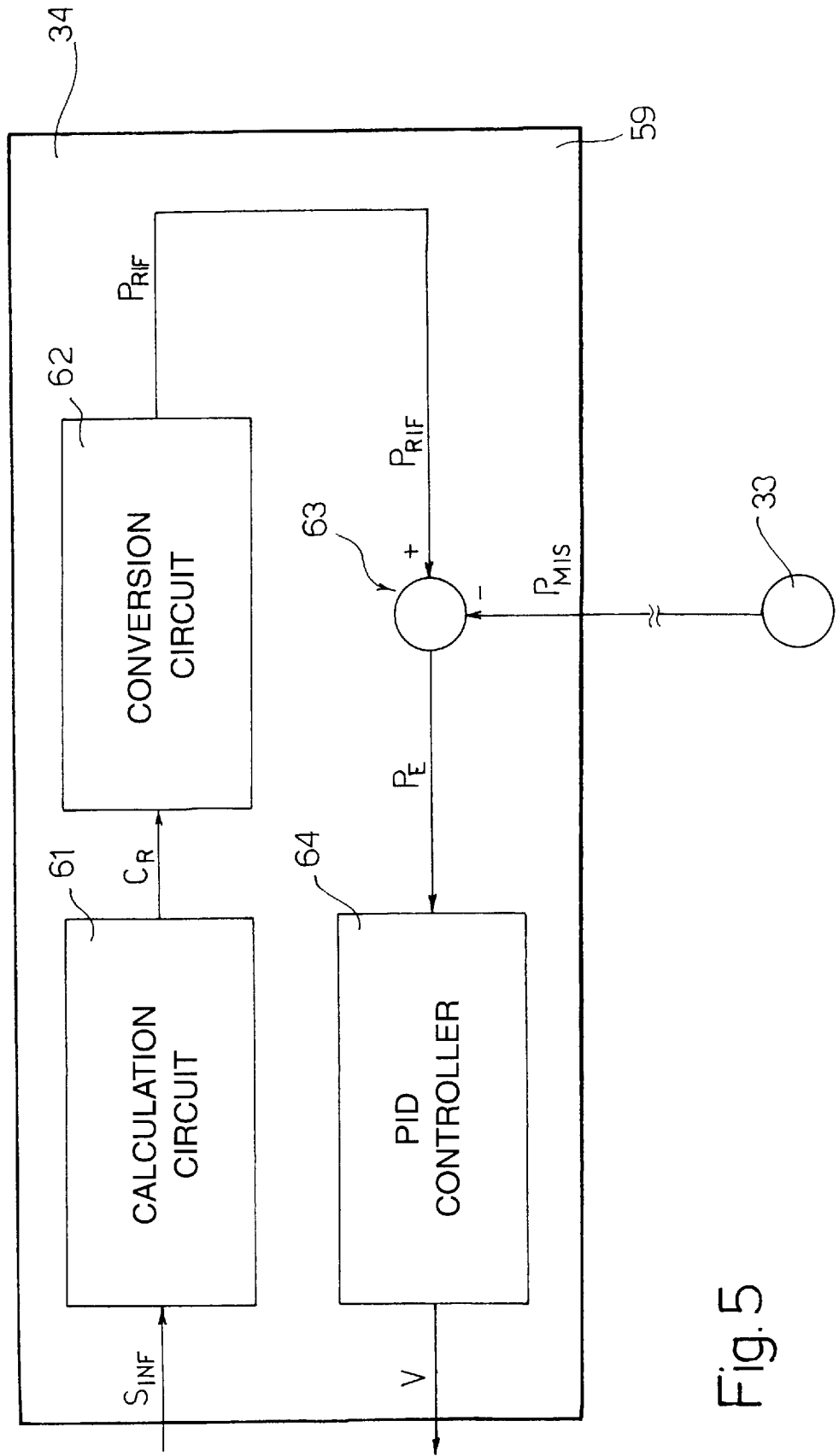
FIG. 5 represents a block diagram of a component of the control device in FIG. 4.

With reference to FIG. 5, the main control circuit 59 comprises a calculation circuit 61, which is similar to the calculation circuit 36, and receives as input the information signals $S_{INF}$, and supplies as output the required torque signal $C_R$, a conversion circuit 62, which is similar to the conversion circuit 37, and receives as input the required torque signal $C_R$, and supplies as output the reference position signal $P_{RIF}$, and an adder circuit 63, which is similar to the adder circuit 38, and supplies as output the position error signal $P_E$ provided by the difference between the reference position signal $P_{RIF}$, and the measuring position signal $P_{MIS}$.

The main control circuit 59 comprises a control circuit 64 of a known type, for example a proportion-integral-derivative controller PID, which receives as input the position error signal $P_E$ from the adder circuit, and generates as output the voltage control signal V for piloting of the first solenoid valve 22. The control signal V is obviously amplified, and converted by a corresponding power circuit (not illustrated).

Figure 6:
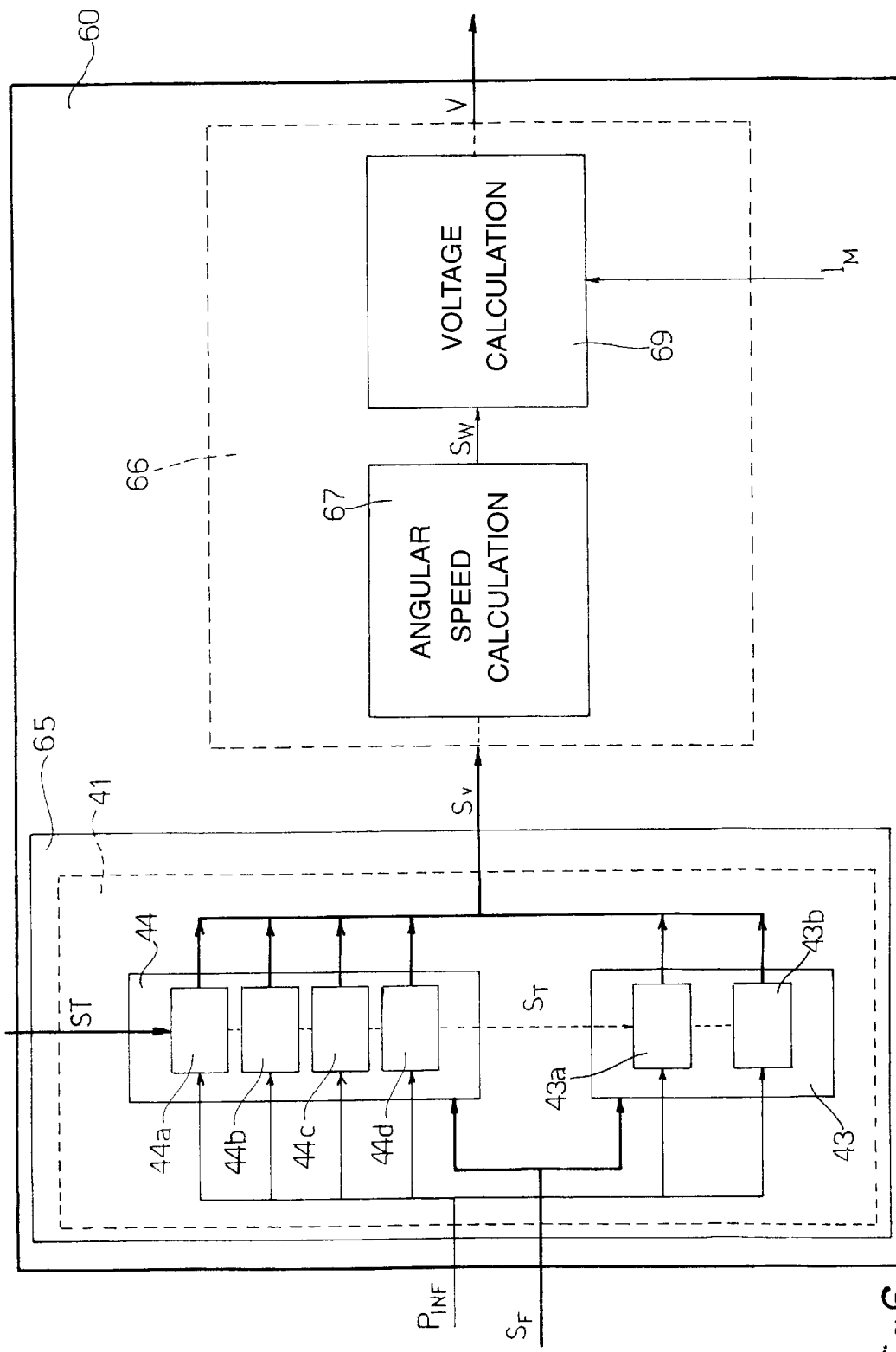
FIG. 6 represents a block diagram of a component of the control device in FIG. 4.

With reference to FIG. 6, the auxiliary control circuit 60 comprises a reading circuit 65, which is equivalent to the reading circuit 40 (and is thus not described in detail), and an open loop calculation circuit 66, which receives as input the speed signal SV from the reading circuit 65, and supplies as output the control signal V.

The open loop calculation circuit 66 comprises an angular speed calculation circuit 67 of a known type, which receives as input the speed signal $S_V$, and supplies as output an angular speed signal $S_W$, which indicates the angular speed W required from the electric motor 55, in order to obtain displacement of the clutch 6, according to the required speed indicated by the speed signal $S_V$.

In detail, the angular speed calculation circuit 67 calculates the angular speed of the electric motor 55, by means of an equation of a known type, which takes into account the characteristics of the transmission unit 56.

Finally, the open loop calculation circuit 66 comprises a voltage calculation circuit 69, which receives as input the angular speed signal $S_W$, and the current signal $I_M$ supplied by the electric motor 55, and, on the basis of the input signals, supplies as output the control signal V.

In particular, the voltage calculation circuit 69 implements a table containing a plurality of numerical values which define a characteristic function $V(I_M, S_W)$ of a known type, which makes it possible to estimate the value of the voltage V to be supplied to the electric motor 56, according to the angular speed W and the electric current $I_M$ which are circulating in the windings (not illustrated) of the electric motor 55 itself.

The control device 1 has the advantage that it is able to supply a correct control signal to the first solenoid valve 22, even if a fault occurs in the position sensor 33, thus guaranteeing accurate activation of the first activator 8, and eliminating the probability and risk of failure to open/close of the clutch 6.

Finally, it is apparent that many modifications and variants can be made to the control device 1 described, all of which come within the scope of the inventive concept, as defined in the attached claims.

What is claimed is:

1. Control device (1) for a clutch (6), wherein an actuator (8) is connected to a clutch (6), and can activate the clutch (6), said control device (1) being characterized in that it comprises:

sensor means (33), which can detect a position of said clutch (6), in order to supply a position signal ($P_{MIS}$);

main control means (34,59), which receive said position signal ($P_{MIS}$) and information signals ($S_{INF}$), and generate as output a control signal (I, V) for said actuator (8);

means (32) for diagnosis, which can detect a state of malfunctioning of said sensor means (33), in order to supply a malfunctioning signal (COM); and auxiliary control means (35), which can be activated in the presence of said malfunctioning signal (COM), in order to transfer control of said actuator (8) from said main control means (34) to said auxiliary control means (35); and characterized in that said auxiliary control means (35) comprise:

means for reading (40, 65), which generate as output a speed signal ($S_V$), which is correlated to a speed of opening/closure of said clutch (6); and means (48, 66) for conversion (48, 66), which receive as input said speed signal ($S_V$), and generate as output said control signal (I, V); and characterized in that said means (40, 65) for reading receive as input said information signals ($S_{INF}$); said speed signal ($S_V$) being generated by said means for reading, according to said information signals ($S_{INF}$).

2. Control device according to claim 1, characterized in that said means (48, 66) for conversion convert said speed signal ($S_V$) into a signal (I) which is representative of a supply current for control of said actuator (8).

3. Control device (1) according to claim 2, characterized in that said means (48, 66) for conversion comprise:

a flow-rate calculation circuit (49), which receives as input said speed signal ($S_V$), and supplies as output a flow-rate signal ($S_Q$), which indicates a required flow rate ($Q_R$) of fluid, which a solenoid valve (22), which is associated with said actuator (8), must supply to the actuator (8) itself, in order to obtain displacement of the clutch (6) according to a speed indicated by the speed signal ($S_V$); and a current calculation circuit (50), which receives as input the flow-rate signal ($S_Q$), and generates as output said control signal (I), which is representative of a supply current.

4. Control device (1) according to claim 1, characterized in that said means (48, 66) for conversion convert said speed signal ($S_V$) into a signal (V) which is representative of a supply voltage for control of said actuator (8).

5. Control device (1) according to claim 4, characterized in that said means (48, 66) for conversion comprise:

an angular speed calculation circuit (67), which receives as input said speed signal ($S_V$), and supplies as output an angular speed signal ($S_W$), which indicates the angular speed (W) required from an electric motor (55), which activates said actuator (54), in order to obtain displacement of the clutch (6) according to a required speed indicated by the speed signal ($S_V$); and a voltage calculation circuit (69), which receives as input said angular speed signal ($S_W$), and generates as output said voltage control signal (V).

6. Control device (1) for a clutch (6), wherein an actuator (8) is connected to a clutch (6), and can activate the clutch (6), said control device (1) being characterized in that it comprises:

sensor means (33), which can detect a position of said clutch (6), in order to supply a position signal ($P_{MIS}$);

main control means (34,59), which receive said position signal ($P_{MIS}$) and information signals ($S_{INF}$), and generate as output a control signal (I, V) for said actuator (8);

means (32) for diagnosis, which can detect a state of malfunctioning of said sensor means (33), in order to supply a malfunctioning signal (COM); and auxiliary control means (35), which can be activated in the presence of said malfunctioning signal (COM), in order to transfer control of said actuator (8) from said main control means (34) to said auxiliary control means (35); and characterized in that said auxiliary control means (35) comprise:

means for reading (40, 65), which generate as output a speed signal ($S_V$), which is correlated to a speed of opening/closure of said clutch (6); and means (48, 66) for conversion (48, 66), which receive as input said speed signal ($S_V$), and generate as output said control signal (I, V); and characterized in that said means (40, 65) for reading receive as input a signal for a state of the clutch ($S_F$), which is indicative of a state of opening/closure of said clutch (6); said means (40, 65) for reading selecting respective tables (43,44) for generation of said speed signal ($S_V$), on the basis of said signal for the state of the clutch ($S_F$).

7. Control device (1) according to claim 6 characterized in that said means (40, 65) for reading receive as input said information signals ($S_{INF}$); said speed signal ($S_V$) being generated by said means for reading, according to said information signals ($S_{INF}$).

8. Control device according to claim 6, characterized in that said means (40, 65) for reading receive as input a signal for an operative condition ($S_T$), which is indicative of a state of functioning of said clutch (6); said means (40, 65) for reading selecting respective sub-tables (43a, 43b, 44a, 44b, 44c, 44d) for generation of said speed signal ($S_V$), on the basis of said signal for the operative condition ($S_T$).

9. Control device (1) according to claim 8, characterized in that said signal for the operative condition ($S_T$) can assume a plurality of levels, each of which corresponds to a respective operative condition; said operative conditions comprising:

an operative condition of opening of the clutch (6) during a pick-up of a vehicle (when acceleration occurs);

an operative condition of opening of the clutch (6) during a change of gear;

an operative condition of maintenance of opening of the clutch (6) during a pick-up;

an operative condition of maintenance of opening of the clutch during a change of gear;

an operative condition of closure of the clutch (6) during a pick-up (when braking occurs);

an operative condition of closure of the clutch (6) during a change of gear.

* * * * *